(12) United States Patent
Millirans

(10) Patent No.: US 7,654,545 B1
(45) Date of Patent: Feb. 2, 2010

(54) VEHICLE FOR EXERCISING

(76) Inventor: Mathew S. Millirans, 3355 Bentley Rd., Ada, OH (US) 44810

( * ) Notice: Subject to any disclaimer, the term of this patent is extended or adjusted under 35 U.S.C. 154(b) by 189 days.

(21) Appl. No.: 11/633,356

(22) Filed: Dec. 4, 2006

Related U.S. Application Data

(60) Provisional application No. 60/742,325, filed on Dec. 5, 2005.

(51) Int. Cl.
*B62M 1/20* (2006.01)
(52) U.S. Cl. .............. 280/223; 280/226.1; 280/282
(58) Field of Classification Search ........ 280/226.1, 280/220, 221, 223–225, 230, 240, 241, 242.1, 280/243, 251–253, 258, 282, 244, 233, 234
See application file for complete search history.

(56) References Cited

U.S. PATENT DOCUMENTS

| | | | | | |
|---|---|---|---|---|---|
| 631,531 | A | * | 8/1899 | Sargent | 280/224 |
| 749,153 | A | * | 1/1904 | Batchelor | 280/220 |
| 1,500,809 | A | * | 7/1924 | Giufri | 280/251 |
| 1,845,044 | A | * | 2/1932 | Curry | 280/269 |
| 2,012,683 | A | * | 8/1935 | Johnson | 280/220 |
| 4,563,000 | A | * | 1/1986 | Gall | 482/72 |
| 4,632,414 | A | * | 12/1986 | Ellefson | 280/246 |
| 4,700,962 | A | * | 10/1987 | Salmon | 280/220 |
| 4,796,907 | A | * | 1/1989 | Geller | 280/220 |
| 4,886,287 | A | * | 12/1989 | Krause et al. | 280/246 |
| 4,941,673 | A | * | 7/1990 | Bennett | 280/242.1 |
| 5,354,083 | A | * | 10/1994 | Liu | 280/233 |
| 5,732,963 | A | * | 3/1998 | White | 280/221 |
| 2003/0116939 | A1 | * | 6/2003 | Monteagudo | 280/244 |
| 2005/0087952 | A1 | * | 4/2005 | Drymalski | 280/244 |

* cited by examiner

*Primary Examiner*—Anne Marie M Boehler
(74) *Attorney, Agent, or Firm*—Jerry Semer

(57) ABSTRACT

This device is exercise equipment. It is a vehicle that is driven by arm and leg power. The device is a three wheeled vehicle that driven by the movement of the handlebars and the seat. The rider moves the handlebars and the seat back and forth. The handlebars are attached to the wheels by a set of pulleys. When the handlebars are moved back and forth they drive the wheels. The handle bars and the seat are attached to each other so that both the legs and the arm are exercised. Thus, an individual can ride around the town in his vehicle exercising his whole body.

11 Claims, 9 Drawing Sheets

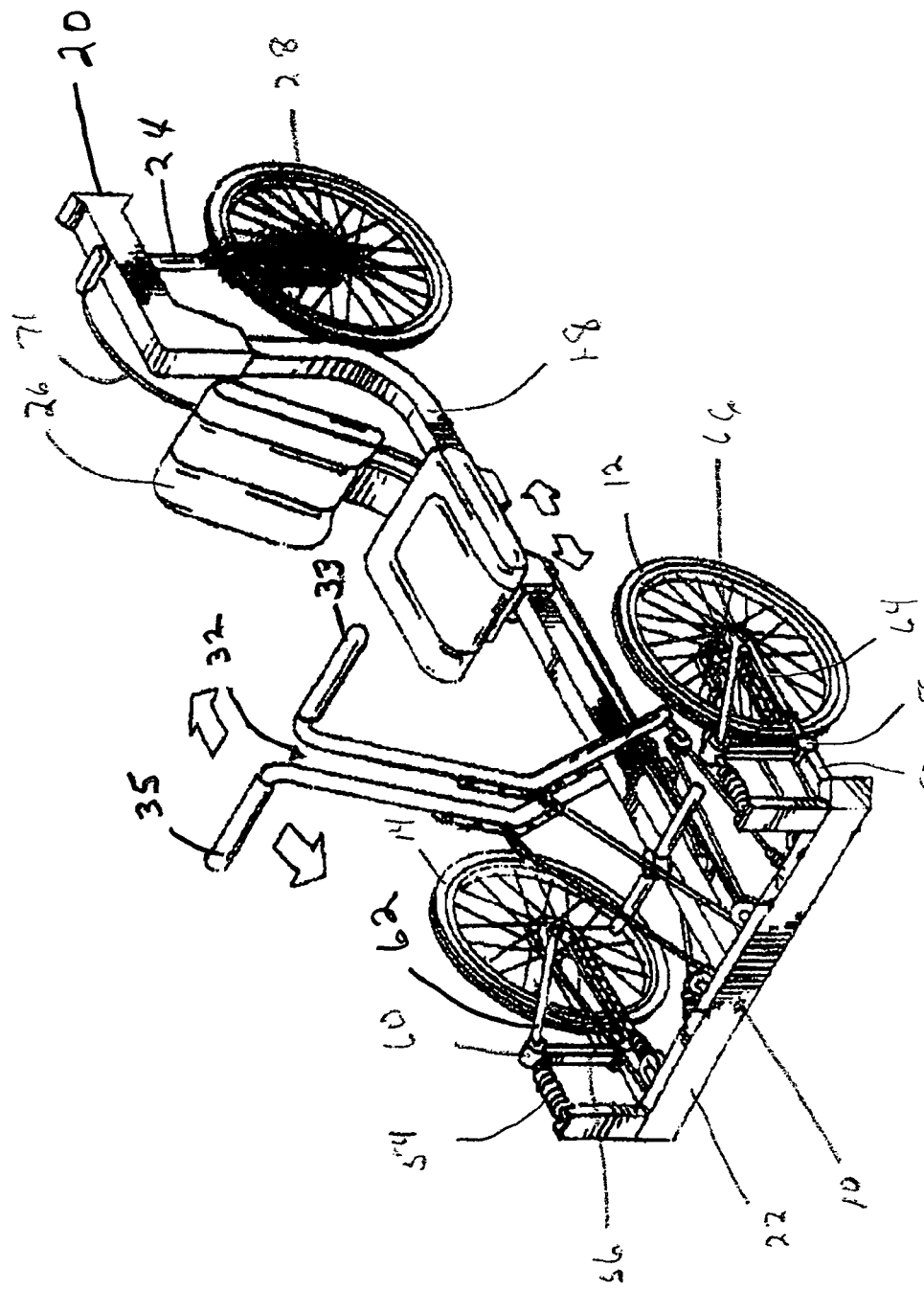

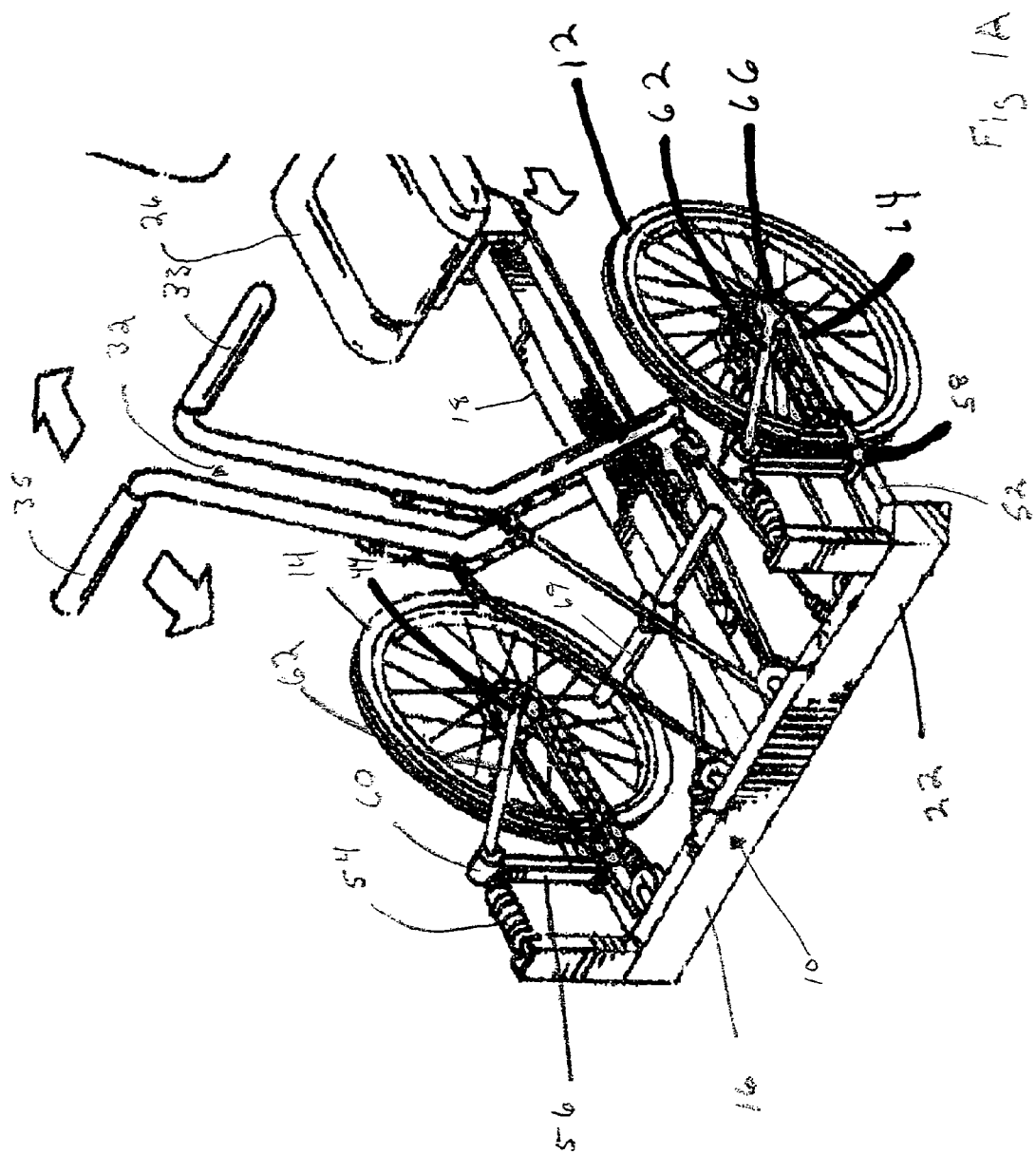

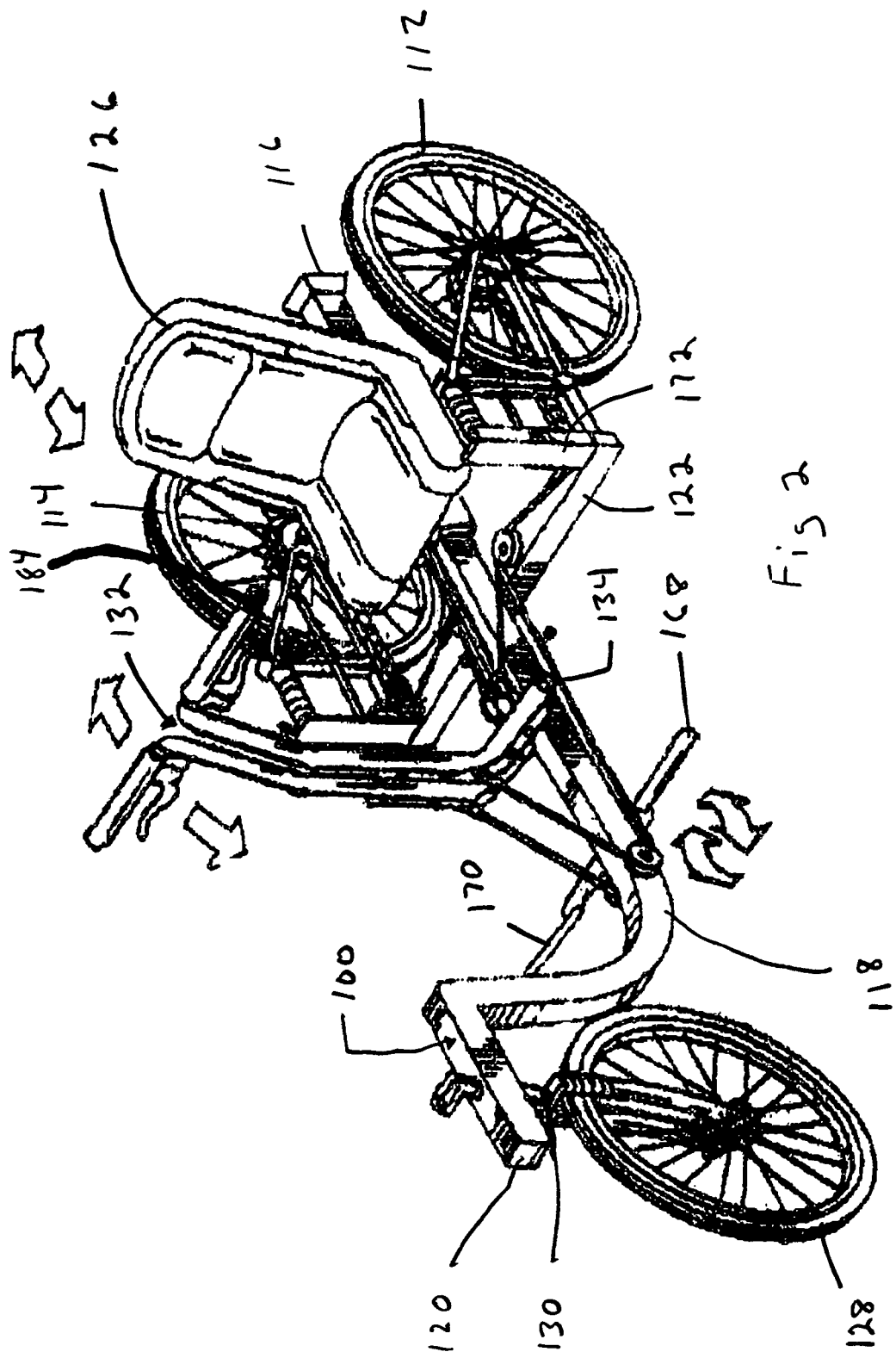

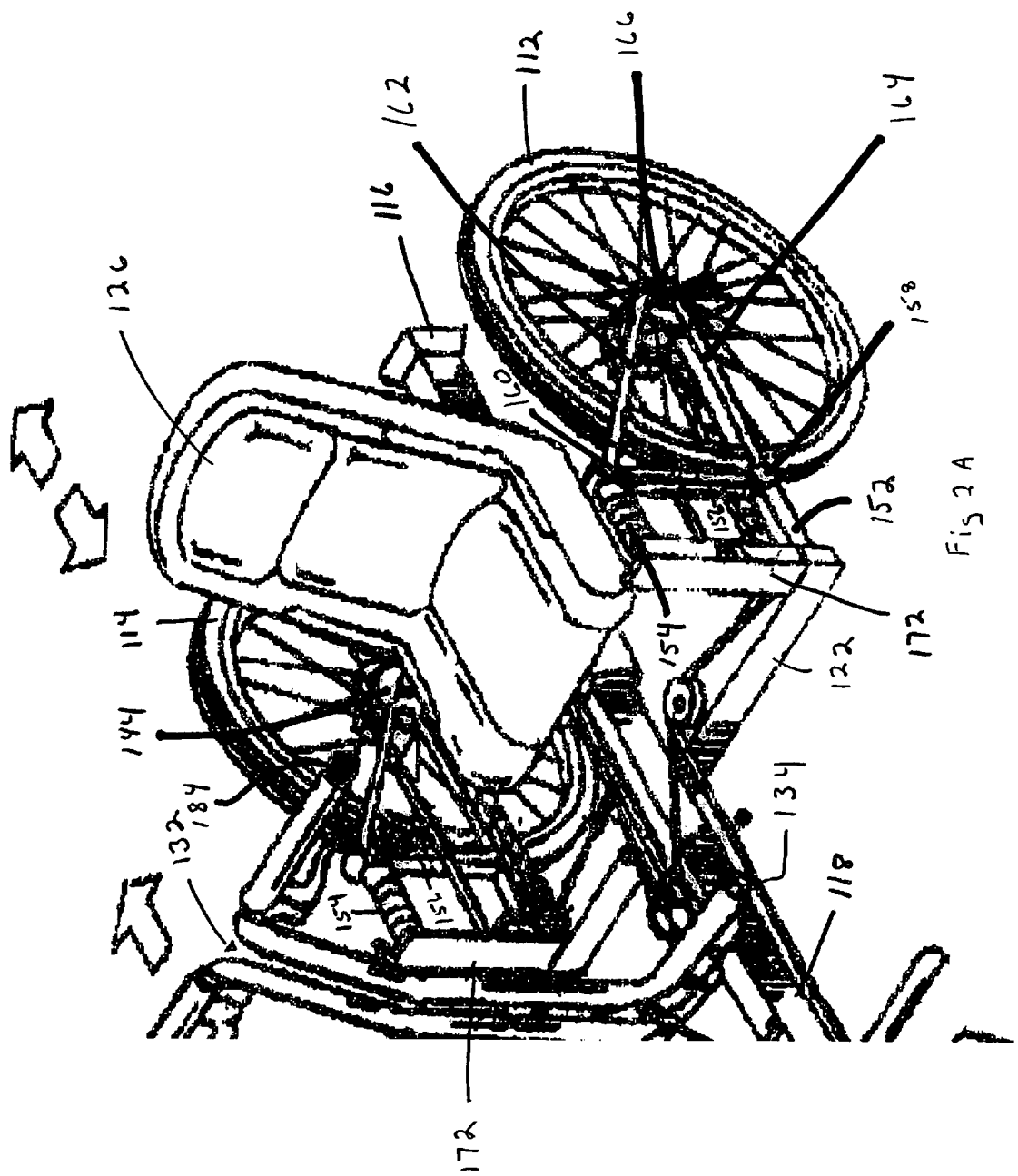

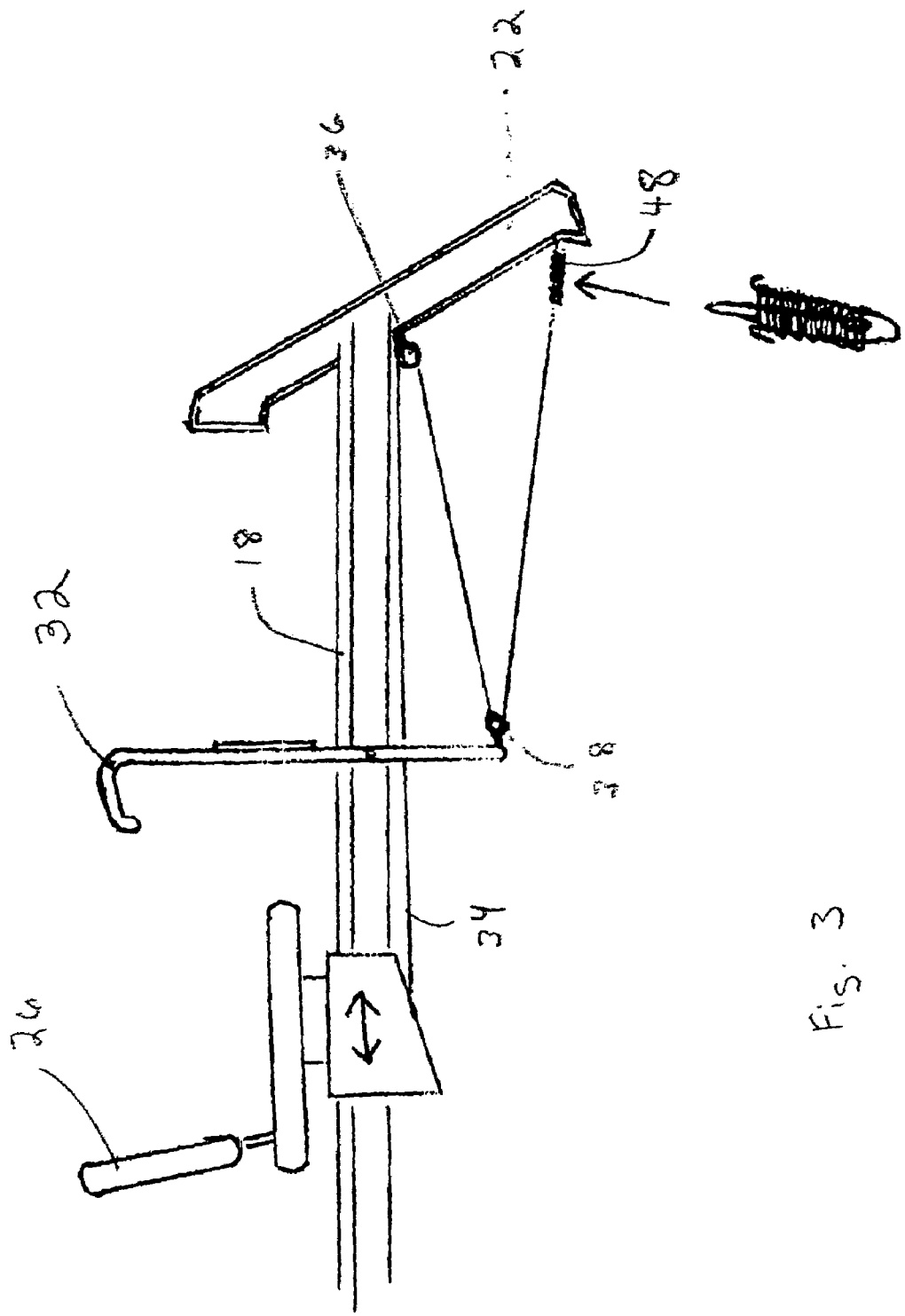

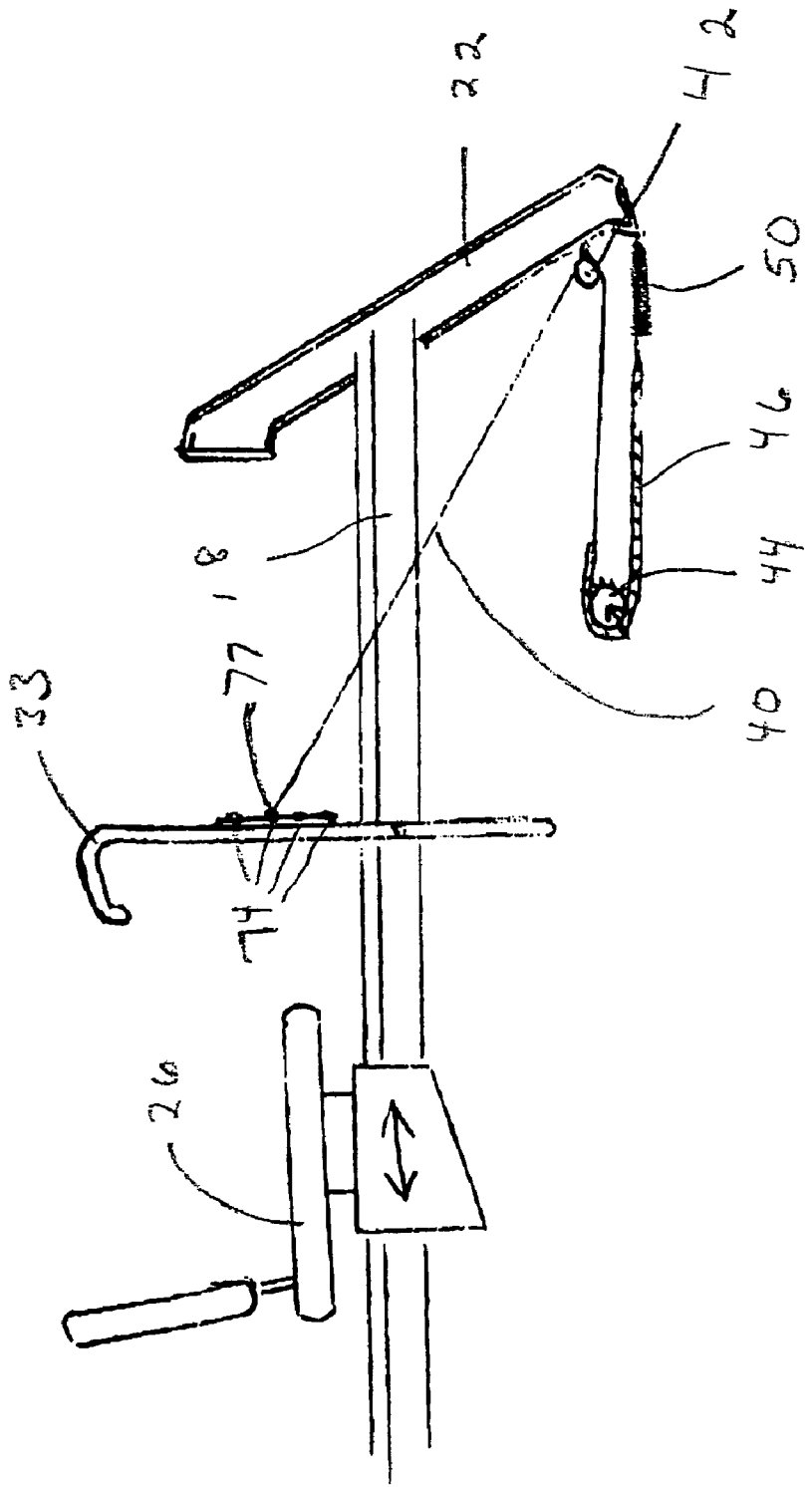

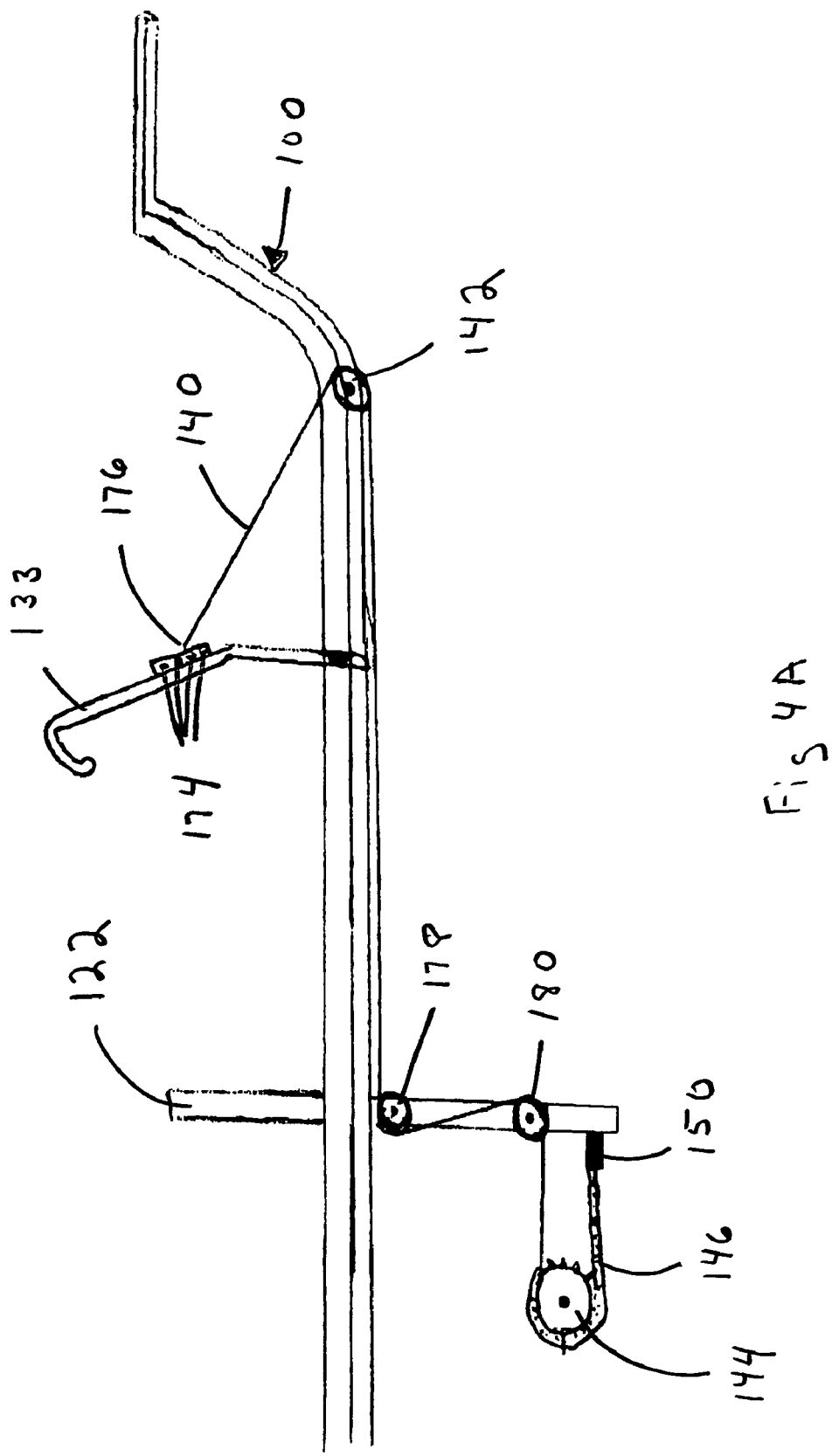

VEHICLE FOR EXERCISING

This application is a continuation-in-part of prior application No. 60/742,325 filed Dec. 5, 2005.

FIELD OF INVENTION

This invention relates to the field of exercise equipment and more particularly to the field of exercise equipment that can be used to move around.

BACKGROUND OF THE INVENTION

People today are living longer. This is somewhat due to the fact that we as a people are exercising more. This is shown on by the fact that there are a great number of patents dealing with exercise equipment. The number of exercise equipment patent has expanded greatly within the last few years. One of the objectives of all exercise equipment is to make exercising fun. Most of us find exercising dull and boring. It is a lot of hard work. Exercise equipment has been designed to make this work more pleasurable. Also individuals use TV iPods, radio, and other devices to help make exercising less tedious. One of the objectives of this invention is to create exercise equipment that makes exercise more pleasurable. To achieve this objective applicant has designed a vehicle that can be ridden outdoors. Although almost all exercise equipment can be used outdoors there are only a few specific pieces that are designed to be used out doors. These include many sports such as tennis basketball baseball and badminton. But for the individual only calisthenics, running or cycling are exercises it done out side. Of all these, the only true piece of exercise equipment is the bicycle. All outdoor exercise for individuals only exercises the legs. One of the objectives of this invention is to create a piece of exercise equipment that exercises the whole body.

The feature that allows this invention to accomplish the objectives is that it is a vehicle that exercises both the arms and no legs. The arms are use to drive the vehicle. The movement of the arms back and forth causes wheels to turn on the vehicle. The legs are exercised by the seat moving back and forth.

SUMMARY OF THE INVENTION

This device is exercise equipment. It is a vehicle that is driven by arm and leg power. The device is a three wheeled vehicle that driven by the movement of the handlebars and the seat. The rider moves the handlebars and the seat back and forth. The handlebars are attached to the wheels by a set of pulleys. When the handlebars are moved back and forth they drive the wheels. The handle bars and the seat are attached to each other so that both the legs and the arm are exercised. Thus, an individual can ride around the town in his vehicle exercising his whole body.

BRIEF DESCRIPTION OF THE DRAWINGS

FIG. 1 is a perspective view of one embodiment of the invention.

FIG. 1A is a perspective view of the front of the embodiment of FIG. 1.

FIG. 2 is a perspective view of another embodiment of the invention.

FIG. 2A is a perspective view of the front of the embodiment of FIG. 2.

FIG. 3 is a view of the system of the seat and handlebar working together of the embodiment of FIG. 1.

FIG. 4 is a view of the power system of the embodiment of FIG. 1.

FIG. 4A is a view of the power system of the embodiment of FIG. 2.

DETAILED DESCRIPTION OF THE PREFERRED EMBODIMENT

Figure 1B:
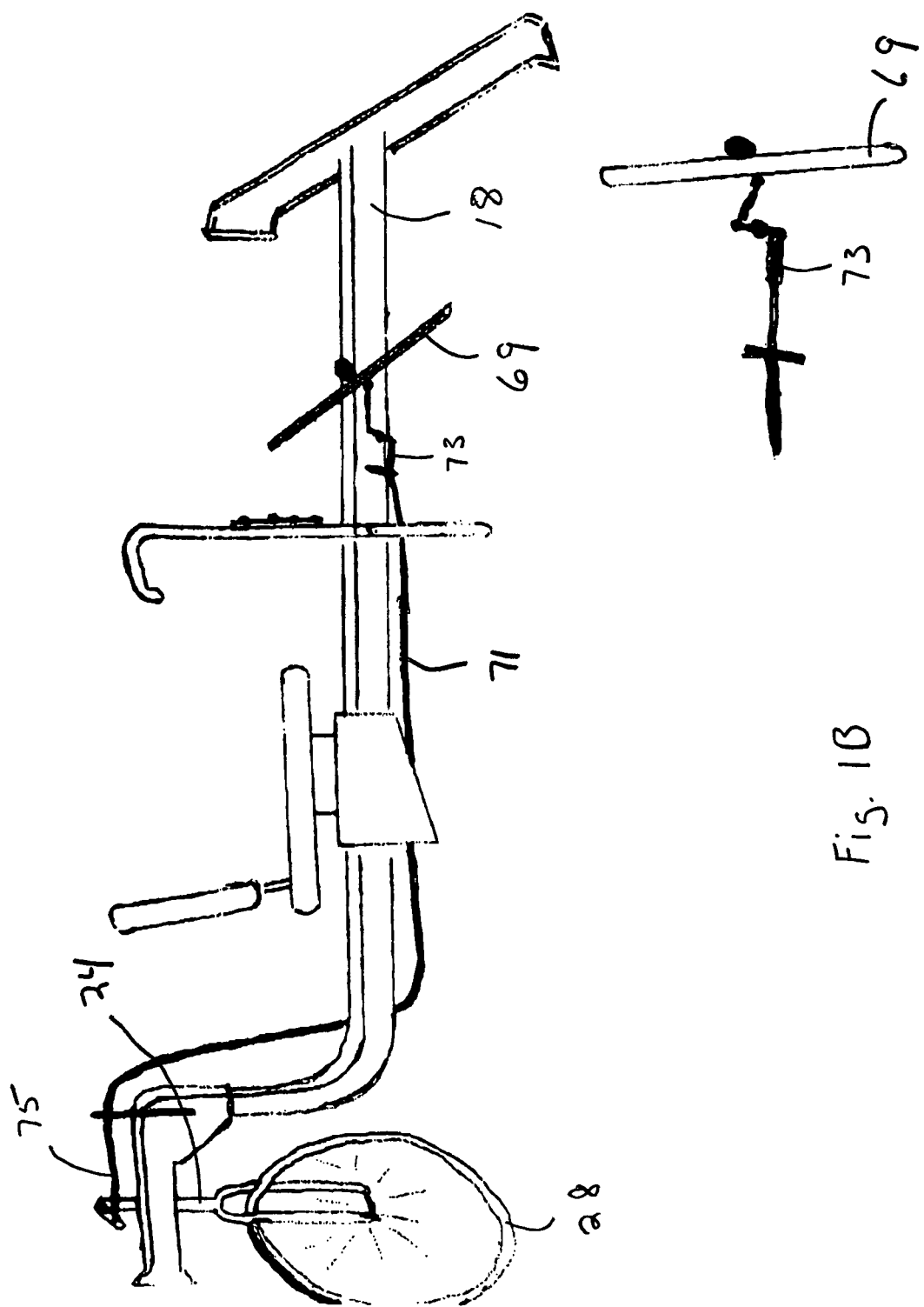
FIG. 1B is a view of the steering system of the embodiment of FIG. 1.

FIG. 1 is a perspective view of one embodiment of the invention. FIG. 1A is a perspective view of the front of the embodiment of FIG. 1. The invention is a three or four wheeled vehicle that is used for exercise. In this embodiment the invention is a three wheeled vehicle 10. In this embodiment the two wheels 12 and 14 of the three wheeled vehicle are on the front 16. In the center of the three at wheeled vehicle 10 is a rail 18 running from the back 20 to the front 16. On the front 16 of the three wheeled vehicle 10 is a bumper 22 that is mounted perpendicular to the rail 18 at the front of rail 18. Attached to the each end of a bumper 22 at the bottom of the bumper 22 is the front wheel suspension bar 52. Attached to the each end of a bumper 22 at the top of the bumper 22 is the front wheel suspension spring 54. Attached across each the front wheel suspension bar 52 and the front wheel suspension spring 54 is the suspension bearings bar 56. The suspension bearing bars 56 are bars that are attach to suspension bars 52 via a rotating bearings 58. The tops of the suspension bearing bars 56 are attached to suspension springs 54. Attached to the top of suspension bearing bars 56 are hub support bearing 60. To each side of the hub support bearings 60 are attached top hub support pieces 62. Attached to each sides of rotating bearing 58 at the bottom of the suspension bearing bars 56 are the bottom hub support pieces 64. The top hub supports pieces 62 and the bottom hub supports pieces 64 are long tubes. At that end each set of the bottom hub support pieces 64 and the top hub support pieces 62 are attached to hub lugs 66. The suspension bearing bar 56 and the top hub support piece 62 and the bottom hub support piece 64 are attached together such that they form a triangle. The top hub support pieces 62 and the bottom hub support pieces 64 extend out from the sides suspension bearing bars 56. Between the sets of top hub support pieces 62 and bottom hub support pieces 64 the wheel 12 or 14 fits. The wheel hub 44 of wheel 12 or 14 is attached to the 3 wheeled vehicle via the hub lug 66. The front wheels 12 and 14 of the three wheeled vehicle 10 have the above described suspension so that they will lessen bumps and holes the three wheeled vehicle may encounter when an individual is using it for exercise.

Along the rail 18 is a seat 26. Seat 26 is slidably attached to rail 18. As rail 18 approaches the back 20 of the three wheeled vehicle 10 it curves upward over the rear wheel 28. Rear wheel 28 is attached to rail 18 by back wheel fork 24. Back wheel fork 24 extends downward from rail 18 over rear wheel 28 which it attaches to the rail 18.

The rear wheel 28 is used for turning. FIG. 1B is a view of the steering system of the embodiment of FIG. 1. An individual riding this embodiment uses his feet for steering. The riders feed are placed on the foot rest and steering bar 69. The foot rest and steering bar is attached to the rail 18 such that it is able to rotate. When an individual pushes his foot to causes the foot rest and steering bar to rotate the three wheeled vehicle turns in that direction. The foot rest and steering bar 69 is attached to a cable 71 with a clevis 73. When the foot rest and steering bar 69 is rotated the cable 71 rotates due to the clevis 73. The other end of the cable 71 is attached to the wheel fork 24 as shown in FIG. 7. The other end of the cable 71 also has a clevis 75. Thus when the cable 71 is rotated by the movement of the foot rest and steering bar 69 the other end of the cable 71 will rotate the wheel fork 24 due to the clevis 75. When the wheel fork 24 is rotated the rear wheel 28 rotates or turns.

Handlebars 33 and 35 make the movable handlebar set 32. Handlebars 33 and 35. work independent of each other. The movable handlebar set 32 are attached to the rail 18 in front of seat 26. The moveable handlebar set 32 are attached such that they can be moved forward towards the front 16 of the three wheel vehicle 10 and backwards towards the back 20 of the three wheel vehicle 10. In the preferred embodiment the moveable handlebar set 32 are attached to the rail 18 by a pivotal bearing 34.

As one rides the vehicle one moves the seat 26 and moveable handlebar set 32 back and forth. FIG. 3 show how the seat 26 and the movable handlebar set 32 are attached by cables to create an exercise device. In FIG. 3 one see that the seat 26 is attach to a seat cable 34. Seat cable 34 run from the seat 26 along the rail 18 to a rail pulley 36 that is attach to the rail 18 just before rail 18 is attached to the bumper 22. The seat cable 34 then turns back and runs through handlebar pulley 38 which is attached to the moveable handlebar set 32. The seat cable 34 than reverses its direction and runs back to the bumper 22 where is hooked to a compression spring 48 which is attached to the bumper 22. This arraignment allows the seat 26 and the moveable handlebar set 32 to work in together.

FIG. 4 shows how the 3 wheeled vehicle 10 is powered. FIG. 4 shows one side of the power system. Each handlebar 33 or 35 works independent of the other. Thus handlebar 33 works wheel 12 and handle 35 works wheel 14. FIG. 4 shows how handlebar 33 drives wheel 12. The power system for handlebar 35 and wheel 14 works exactly the same as for handlebar 33 and wheel 12. Also the means for adjusting the amount of energy necessary to move the handlebars 33 and 35 works the same for each handlebar 33 and 35. By allowing the handlebars to work independent of each other, this lets the 3 wheeled vehicle 10 in the preferred embodiment to go uphill. A power cable 40 is attached to handlebar 33. One end of the power cable 140 has a hook 77 that releasably attaches to the handlebar 33. The handlebar 33 has openings 74 running down the handlebar 33. The hook 77 on the end of a power cable 40 is designed to fit within each of the openings 74. By moving the hook 77 from one opening 74 to another opening 74 one would change the amount of energy necessary to move the handlebar 33 back and forth. Thus, one can increase or decrease one's exercise effort by moving the hook 77 to a different opening 74.

The power cable 40 from handlebar 33 runs to a bumper pulley 42 attached to the bumper 22. The power cable 40 than reverses it direction and runs towards wheel hub 44 in wheel 12 or 14. In the preferred embodiment wheel hub 44 is a three speed bicycle hub. However, this hub could be any type of hub which acts like a bicycle freewheel. The power cable 40 is attached to bicycle chain 46 which encircled wheel hub 44. The end of the bicycle chain 46 not attached to the power cable 40 is attached to a spring 50 which is attached to the bumper 22.

FIG. 2 is a perspective view of another embodiment of the invention. FIG. 2A is a perspective view of the front of the embodiment of FIG. 2. This embodiment as the previous embodiment is a three wheeled vehicle 100. In this embodiment the two wheels 112 and 114 of the three wheeled vehicles are on the back 116. Running down the middle of the three wheeled vehicle is the rail 118. Along the rail 118 is the seat 126. Seat 126 is slideable and attaches to rail 118. As the rail 118 approaches the front 120 of the three wheel vehicle 100, it curves upward over the front wheel 128. The front wheel 128 is attached to rail 118 by a front wheel fork 130. The front wheel fork 130 is similar to a bicycle fork. The front wheel fork 130 extends downward from rail 118 over the front wheel 128.

Figure 2B:
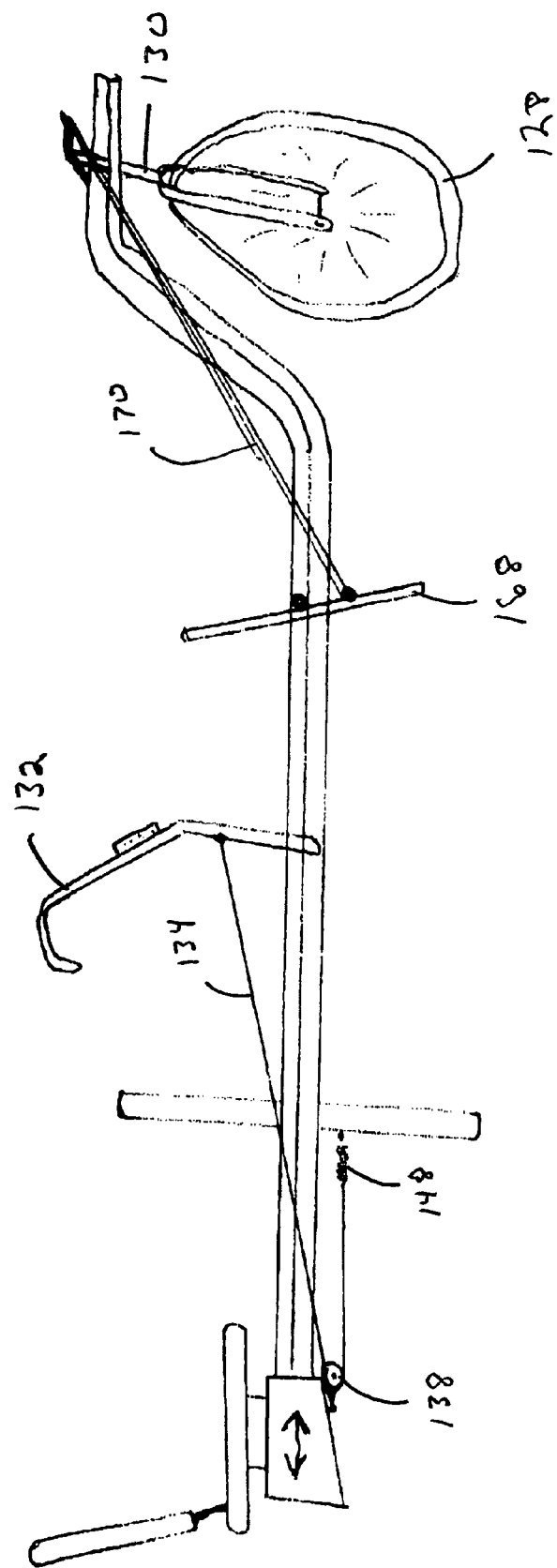
FIG. 2B is a view of the steering system and a view of the system of how the seat and handlebar work together of the embodiment of FIG. 2.

The steering system for the three wheeled vehicle 100 is shown in FIG. 2B. As one moves along rail 118 from the front 120 one finds the front foot rest and steering lever 168. The front foot rest and steering lever 168 is attached to the rail 118 such that it can rotate. Attached to a one end of the foot rest and steering lever 168 is the steering bar 170. Attached to the other end of the steering bar 170 is the front wheel fork 130. The a front wheel fork 130 extends through the rail 118 and at the top of the front wheel fork 130 is attached to the steering bar 170 such that when the steering bar 170 moves forward it will turn the front wheel fork 130 which turns the front wheel 128. When the steering bar 170 by the foot rest and steering lever 168 is moved rearward, the steering bar 170 again turns the front wheel fork 130 which turns the front wheel 128. Thus an individual riding the three wheeled vehicle 100 can turns the three wheeled vehicle 100 via the front foot rest and steering lever 168.

As one moves further along the rail 118 towards the back 116 of the three wheeled vehicle 100, one encounters the movable handlebar set 132. The movable handlebar set 132 are attached to rail 118 in front of seat 126. The moveable handlebar set 132 are attach such that they can move forward towards the front 120 of the three wheeled vehicles 100 and backwards towards the back 116 of the three wheeled vehicle than 100. In the preferred embodiment the movable handlebar set 132 are attached to rail 118 by a pivotal bearing 134. As in the previous embodiment the moveable handlebar set 134 is made up of handlebars 133 and 135 which work independent of each other in driving the 3 wheeled vehicle 100.

As one moves further along the rail 118 towards the back 116 of the three wheel vehicle 100 one encounters the seat 126. The seat 126 is slidable and is attached rail 118. Between the seat 126 and the movable handlebar set 132 is the back piece 122 that is mounted perpendicular to the rail 118. Attached to each end of the back piece 122 is the horizontal piece 172 that runs upward from the back piece 122. Also I attached to each end of the back piece 122 is the back wheel suspension bar 152. Both back wheel suspension bars 152 extends rearward from the back piece 122. Attached to the top of each horizontal piece 172 is the back wheel suspension spring 154. Attached across each of the back wheel suspension bars 152 and the back wheel suspension springs 154 is the back wheel suspension bearing bar 156. The back wheel suspension bearing bars 156 are bars that are attached to the back wheel suspension bars 152 via rotating bearings 158. The tops of the back wheel suspension bearing bars 156 are attached to the back wheel suspension springs 154. Attached to the top of the back wheel suspension bearing bars 156 are hub support bearings 160. To each side of the hub support bearings 160 is attached a top hub support piece 162. Attached to each side of the rotating bearings 158 at the bottom of the back wheel suspension bearing bars 156 are the bottom hub support pieces 164. The top hub support pieces 162 and the bottom hub support pieces 164 are long tubes. The ends of each set of bottom hub support pieces 164 and the top hub support pieces 162 are attached to a hub lugs 166. The back wheel suspension bearing bar 156, the top hub support piece 162 and the bottom hubs support piece 164 are attach together such as they form a triangle. The top hub support pieces 162 and the bottom hubs support pieces 164 extend out from the sides of the back wheel suspension bearing bars 156. Between the sets of top hub support pieces 162 and bottom hub support pieces 164 the wheel 112 or 114 fits. The wheel hub 144 of wheel 112 or 114 is attached to the three wheeled vehicle 100 via the hub lug 166. The back wheels 112 and 114 of the three wheeled vehicle 100 have the above described suspension so that they will lessen the bumps and holes the three wheeled vehicle 100 may encounter when an individual is using it for exercise.

FIG. 4A shows how the 3 wheeled vehicle 100 is powered. FIG. 4A shows one side of the power system. Each handlebar 133 or 135 works independent of the other. Thus handlebar 133 works wheel 112 and handle 135 works wheel 114. FIG. 4A shows how handlebar 133. drives wheel 112. The power system for handlebar 135 and wheel 114 works exactly the same as for handlebar 133 and wheel 112. Also the means for adjusting the amount of energy necessary to move the handlebars 133 and 135 works the same for each handlebar 133 and 135. A power cable 140 is attached to the handlebar 133. The power cable 140 has a hook 176 that releasably attaches to the handlebar 133. handlebar 133 have openings 174 running down the handlebar 132. The hook 176 on the end of a power cable 140 is designed to fit within each opening 174. By moving the hook 176 from one opening 174 to another opening 174 one would change the amount of energy necessary to move the handlebar 133 back and forth. Thus, one can increase or decrease one's exercise effort by moving the hook 176 to different openings.

FIG. 4A shows the power cable 140 runs from handlebar 133 to a rail pulley 142 attached to the rail 118. The power cable 140 then reverses direction and runs back piece pulley 178. The power cable 40 then moves around them back piece pulley 178 and moves towards horizontal piece pulley 180. The power cable 140 then runs towards wheel hub 144 in wheel 112 or 114. In the preferred embodiment wheel hub 144 is a three speed bicycle hub. However, this could be any type of hub that acts like a bicycle free wheel. The power cable 140 is attached to the bicycle chain 146 which encircles a wheel hub 144. The end of a bicycle chain 146 that is not attached to in the power cable 140 is attached to a spring 150 which is attached to the back piece 122. When the handlebar 133 is moved backwards this causes the bicycle chain 146 to move forward and thus causes the wheels 112 or 114 to move forward. When the handlebar 133 is moved forward the spring 150 pulls of the bicycle chain 146 back. This causes a wheel hub 144 to move backwards however, the wheel hub 144 when it moved backwards does not affect the movement of the bicycle chain 146 or the wheels 112 or 114.

In FIGS. 2 and 2A one sees at the end the handle 182 of handlebar 133, a gear level 184. This gear level 184 is attached to the three speed bicycle hub 144. When the one clicks the gear lever 184 and changes the gears within the three speed hub 144, this also changes the amount of effort necessary to drive the three wheeled vehicle 100 and the amount of exercise effort. The wheel hub 144 in this embodiment is a three speed hub but it could any speed hub that is known in the art.

As one rides in the three wheeled vehicle one moves the seat 126 and the moveable handlebars 132 back and forth. FIG. 2B shows how the seat 126 and the handlebars 132 are attached by cables to create an exercise device. In FIG. 2B one sees that the moveable handlebars 132 are attached to the seat cable 134. Seat cable 134 runs from the moveable handlebar 132 to the seat 126. The seat cable 134 than encircles a seat pulley 138 located under the seat 126. The seat cable 134 then reverses itself and runs to compression spring 148 which is attached to the back piece 122. This arrangement allows the seat 126 and the handlebars 132 to work together.

Changes and modifications in the specifically described embodiments can be carried out without departing from the scope of the invention which is intended to be limited only by the scope of the appending claims.

I claim:

1. An exercise vehicle comprising:
   a. a frame: and,
   b. wheels attached to the frame; and,
   c. a movable seat attached to the frame designed to carry an individual; and,
   d. moveable handle bars; and,
   e. a means to powering the vehicle that drives the wheels through the movement of the handlebars; and,
   f. a means for steering the vehicle attached to the frame
   g. a means to allow the seat to work in conjunction with the handlebars to provide power for the vehicle comprising:
      1) a cable attached to the seat at one end; and,
      2) a spring attached at one end to the frame; and,
      3) the other end of the cable attached to the other end of the spring; and,
      4) a pulley through which the cable is threaded attached to the handlebars such that when the handlebars are moved the seat and handlebars work in conjunction to provide power for the vehicle.

2. An exercise vehicle as in claim 1 wherein:
   a. the means for powering the vehicle is adjustable in that an individual can adjust the amount of force necessary to drive the wheels.

3. An exercise vehicle as in claim 1 wherein:
   a. the means for powering the vehicle comprises:
      1) a power cable with two ends and one end is attached to the handlebars; and,
      2) a set of pulleys through which the power cable is run; and,
      3) a bicycle chain with one end that attaches to the end of the power cable not attached to the handlebars and the other end attaches to a spring which attaches to the frame of the vehicle ; and,
      4) one of said wheels has a hub with a free wheel and said hub is design to be driven by a bicycle chain; and,
      5) said bicycle chain encircles said hub such that the bicycle chain will drive the hub; and
      6) whereas the movement of the handlebars causes the chain to move around the hub driving the wheel.

4. An exercise vehicle as in claim 3 wherein:
   a. the power cable can be attached to the handlebars at several different points and by attaching the power cable at these differing points one can vary the amount of force necessary to drive the wheels.

5. An exercise vehicle as in claim 1 wherein:
   a. the means for powering the vehicle comprises:
      1) a power cable with two ends and one end is attached to the handlebars; and,
      2) a set of pulleys through which the power cable is ran; and,
      3) a bicycle chain with one end that attaches to the end of the power cable not attached to the handlebars and the other end attaches to a spring which attaches to the frame of the vehicle ; and,
      4) one of said wheels has a hub with a free wheel and said hub is design to be driven by a bicycle chain; and,
      5) said bicycle chain encircles said hub such that the chain will drive the hub; and 6) whereas the movement of the handlebars causes the chain to move around the hub driving the wheel.

6. An exercise vehicle as in claim 5 wherein:

a. the power cable can be attached to the handlebars at several different points and by attaching the power cable at these differing points one can vary the amount of force necessary to drive the wheels.

7. An exercise vehicle as in claim 1 wherein:

a. the means for steering the vehicle attached to the frame steers the vehicle by the individual riding in the vehicle using his feet.

8. An exercise vehicle as in claim 1 further comprising:

a. a suspension system that make the ride of the vehicle less uneven thus adding to the comfort of the rider.

9. An exercise vehicle comprising:

a. a frame: and, b. wheels attached to the frame; and, c. a movable seat attached to the frame designed to carry an individual; and, d. moveable handle bars; and, e. a means to powering the vehicle that drives the wheels through the movement of the handlebars; and, f. a means for steering the vehicle attached to the frame a. the means to allow the seat to work in conjunction with the handlebars to provide power for the vehicle comprises;

1) a cable attached to the handlebars at one end; and, 2) a spring attached at one end to the frame; and, 3) the other end of the cable attached to the other end of the spring; and, 4) a pulley through which the cable is threaded attached to the seat such that when the handlebars are moved the seat and handlebars work in conjunction to provide power for the vehicle.

10. An exercise vehicle as in claim 9 wherein:

a. the means for powering the vehicle comprises:

1) a power cable with two ends and one end is attached to the handlebars; and, 2) a set of pulleys through which the power cable is ran; and, 3) a bicycle chain with one end that attaches to the end of the power cable not attached to the handlebars and the other end attaches to a spring which attaches to the frame of the vehicle ; and, 4) one of said wheels has a hub with a free wheel and said hub is design to be driven by a bicycle chain; and, 5) said bicycle chain encircles said hub such that the chain will drive the hub; and 6) whereas the movement of the handlebars causes the chain to move around the hub driving the wheel.

11. An exercise vehicle as in claim 10 wherein:

a. the power cable can be attached to the handlebars at several different points and by attaching the power cable at these differing points one can vary the amount of force necessary to drive the wheels.

\* \* \* \* \*